Patented Aug. 11, 1953

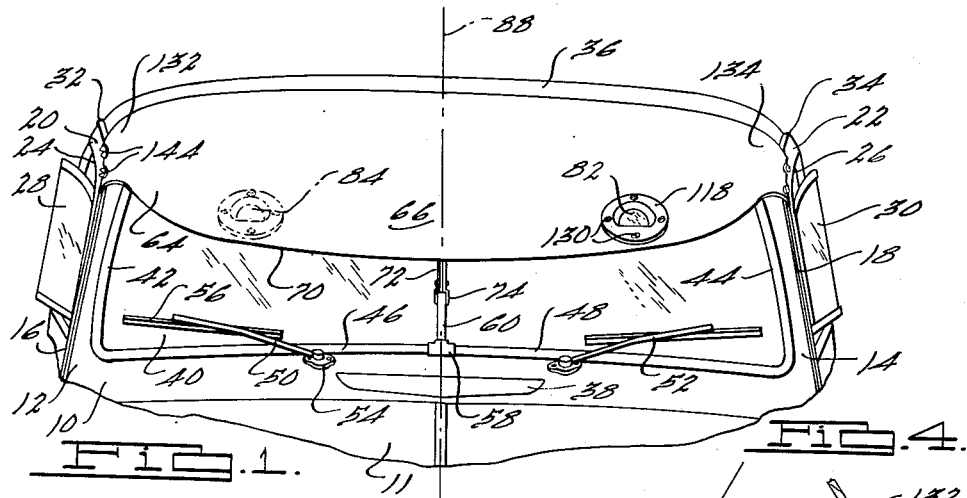
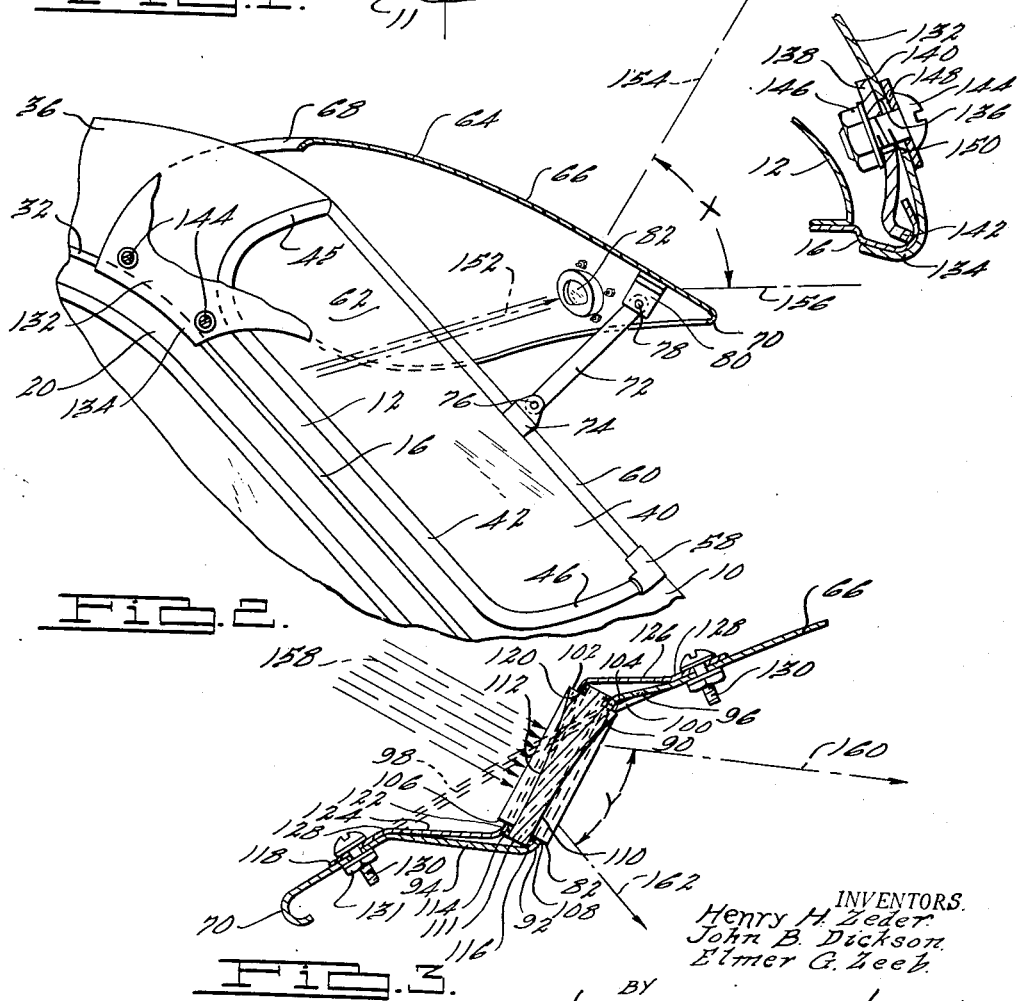

2,648,566

UNITED STATES PATENT OFFICE 2,648,566

VISOR APPARATUS

Henry H. Zeder, Pleasant Ridge, John B. Dickson, Highland Park, and Elmer G. Zeeb, Grosse Pointe Woods, Mich., assignors to Chrysler Corporation, Highland Park, Mich., a corporation of Delaware Application September 29, 1949, Serial No. 118,632

5 Claims. (Cl. 296—95)

This invention relates to improvements for vehicle visors of the type employed for protecting the eyes of the vehicle driver from lights, sun glare, and the like, with means provided for projecting the view of the driver beyond the actual sweep of the visor for the purpose of observing more completely and conveniently relatively overhead traffic conditions.

Conventionally, vehicle traffic is regulated largely by automatic signal lamps of the type which may be arranged at street intersections to produce differently colored and disposed lights for traffic guidance. These signals may occupy elevated positions and in many instances are situated exactly in the center of a given street intersection in a suitable suspended or supported position above the intersection. Again, the lights may be located adjacent the street curbing. In any event, it is an inconvenient matter for a vehicle operator to observe lights and signals carefully when approaching the light or signal closely.

It is a feature of the instant invention to provide in a part of the visor an improved means for permitting observation in effect through the visor from the driver's position for the purpose of facilitating the reading and observance of traffic direction and other signals.

Other features will become manifest from the description which follows which has reference to the appended drawing, and which sets forth a non-limitative example. This description allows a thorough understanding of how the invention can be embodied, and those peculiarities which appear in the drawing as well as in the text constitute, of course, a part of the said invention.

In the drawing,

Figure 1 is a fragmentary frontal view of a vehicle to which the improved visor has been applied;

Figure 2 is a fragmentary side view;

Figure 3 is a section through the viewer lens of the improved visor; and

Figure 4 is a section through the supporting portion of the visor.

With particular reference to Figures 1 and 2, a vehicle is shown having a body 10 and a hood portion 11 defining a compartment forward of the body portion. Rising out of body 10 are windshield pillars 12 and 14 which together with drip moldings or rain gutters 16 and 18 constitute moldings at the forward quarters of the vehicle. Doors 20 and 22 may be swung on the vehicle body so as to cooperate with body pillars 12 and 14 in forming the sides of the vehicle. Doors 20 and 22 are formed with window openings 24 and 26 in which panes, such as at 28 and 30, may be used for selective closure thereof. Gutter extensions 32 and 34 may be provided for the drip moldings 16 and 18 along the top 36 of the vehicle. In the cowl at the rear of hood 11 may be provided a cowl vent member 38 and to the rearwardly thereof the vehicle windshield 40. Suitable seals and trim surround the side edges of the windshield at 42 and 44 and also the top and bottom of the windshield at 45, 46, and 48. Windshield wiper arms 50 and 52 may be disposed on either side of the windshield to rotate about pivotal brackets such as at 54 for sweeping the windshield wiper blade 56 over the windshield to clear it. A structural fitting 58 attached at either side to permit moldings 46 and 48 is also attached to a center or division strip 60 which may be provided for windshield 40. Disposed to overlie the upper area 62 of windshield 40 may be mounted a substantially bow-shaped sun visor apparatus having an elongated supported portion or body part 66. The upper edge of the visor may be constituted by a down-turned flange 68 and the lower edge of the visor may be constituted by a rolled rim or bead 70. The members 68 and 70 serve to provide stiffness to the elongated supported portion 66 of the visor. In addition to the rigidity lent by the members just described, supporting brace 72 may also be provided further to rigidify the visor. Brace 72 may be fitted at its lower end with clamps or jaws 74 shiftably lockable in selective positions along the division strip 60. Pivot 76 connects the center brace to clamp 74 and a pivot 78 at the upper end of the brace provides a connection to a bracket 80 attached centrally of the visor by rivets, welding, or other means.

Mounted to the visor may be provided a viewer lens or eye 82 in such disposition as to be normally in front of the vehicle driver. A similar eye 84 may be located on the opposite side of the transverse axis 88 of the visor and vehicle for the benefit of other occupants of the front seat. Eye 84 might conceivably be alternatively mounted below edge 70 of the visor.

In regard to Figure 3 particularly, adjacent the lower edge 70 of the supported portion 66 of the visor and in spaced relation thereto may be provided an opening 90 defined by a flange 92, which may be disposed in a single plane. Flange 92 is carried by angle members 94 and 96 which may be pressed or otherwise fabricated in a deformed relation relative to the normal smooth contours 98 and 100 of supported portion 66.

Viewer lens 82 cooperates with this opening, being formed with arcuate rims 102 and 104 on its opposite faces and faced-off edges 106 and 108, some of which may enter the opening 90. The lens 82, which may be of an unbreakable plastic, a synthetic, or glass, is provided at its central region with concave faces 110 and 112, which constitute a concavo-concave or double concave type lens. Inasmuch as the lower thicker part of the lens does not contribute in its refractive capacity toward viewing overhead objects, lens 82 is cut off and faced at edge 111, thereby affording a much larger than ordinary strength and size for a lens commensurate with the area of opening 90 in the visor. That is to say, lens 82 by its unique configuration is better able to employ the effective area of a given size opening and yield a fuller image and more complete detail in the overhead view.

As cushioned between elements 114 and 116 abutting shoulders thereon, the lens 82 is adapted to be held in position by a retainer 118. Retainer 118 has formed therein an opening 120 which generally spacedly registers with the opening 90 formed in supported portion 66 of the visor. Opening 120 is defined by a flange 122 which is formed on angled portions 123 and 126 of the retainer and may be disposed in a single plane. An attaching flange 128 forms the periphery of the retainer and is provided for the reception of fasteners which may be threaded as at 130 in order threadably to receive complemental parts 131. It is to be observed that supported portion 66 of the visor is disposed so as to be noticeably inclined to the vertical. It is by means of the angularity of angled members 94, 96, 124, and 126 that lens 82 is able to assume an inclination more nearly approaching that of the vertical. If plastic is the material selected for the lens, and indeed plastic is to be considered a preferable material, then breakage will be reduced to a minimum. However, in order to accommodate the contingency of breakage, the retainer 118 has been designed to be detachably secured to the visor and may be conveniently removed to replace the lens or to clean or inspect it.

In regard to the supporting portions 132 and 134 of the visor shown in Figures 1, 2, and 4, the lower ends thereof are formed with curved portions 134 which complementally receive drip moldings such as molding 16 which border the windshield of the vehicle. The supported portion 66 of the visor, being preferably constructed of resilient sheet metal, is formed with a permanent flex such that when extended and curved portion 134 is disposed adjacent the drip molding the visor has an inherent tendency to cling in position to the vehicle. The arc of the bow-shaped visor is such as to maintain a spacing between the body molding 12 of the pillars and the supporting portion 132 of the visor. A clamp 138 may be located adjacent opening 136 formed in the supporting portion 132 of the visor. Opening 136 may be somewhat elongated in order to permit adjustment of the clamp 138 toward and away from drip molding 16. A heel or fulcrum portion 140 on clamp 138 provides for swingable clamping movement of the clamp portion 142 within the boundaries of the drip molding 16. For facilitating the adjustable clamping action of clamps 138, fasteners such as at 144 may be provided and a complemental part 146 threadably or otherwise received thereon. Washers 150 and 148, of which the latter serve the additional purpose of covering elongated slot 136 may also be located on the fasteners.

In the operation of the foregoing device particularly as is brought out in Figure 2, the line of sight 152 of the vehicle driver is such as to bear directly on the opening in which is fitted lens 82. The lens, being a divergent one, is able to bend the line of vision in passing therethrough into the arc bounded roughly by lines 154 and 156 and measured by the indicated angle X. Notwithstanding the fact that the supported portion 66 of the visor normally would create a blind spot in the upper reaches of windshield 40, the driver can by means of lens 82 view effectively beyond the sweep of the visor. Thus the driver will find it convenient to follow the indication and action of colored overhead traffic lights even when he is close upon them.

The preferred embodiment of the invention has been shown and described. Within the broader aspects of the invention, however, those constructions are comprehended which would include, for example, a system of mirrors cooperating to afford a line of sight in effect through an opening in the visor. One such scheme proposed contemplates a convex mirror which spacedly registers with the aperture in the visor. It will be appreciated that the instant plastic lens, however, serves a two-fold purpose. That is to say, with an optical system including mirrors, the sun rays might be inclined to penetrate the opening in the visor and when lined properly with the driver's eyes would tend to blind him. This situation is partially, although perhaps not satisfactorily, relieved by the partial obstruction afforded by the mirror in spacing to the opening. With a divergent lens, covering the opening, however, the lens faces and resulting refraction may be so determined as to cause the oncoming sun rays to be diverged and scattered harmlessly thereby preventing a glare which will adversely affect the vision of the vehicle driver. As illustrated in Figure 3, when the sun rays 158 pass through diverging lens 82 they are dispersed throughout the arc Y bounded by lines 160 and 162 with a consequent divergence angle rendering them substantially harmless to the driver. It is common knowledge that when an illuminated or luminescent object is viewed through a divergent lens the apparent size and field of light emission therefrom is greatly diminished.

It is to be understood that any embodiment just described has been given only by way of example and can be altered without, by so doing, departing from the scope of the invention.

What is claimed is:

1. For use with an operator-operated automotive vehicle characterized by a windshield having at least an upper part, and molding structure thereadjacent: an exterior light shade comprising the combination of an elongated body portion tending to obstruct visibility and being provided with an aperture in the line of vision of the operator, supporting portions for said body portion for supporting the same adjacent said upper part of the windshield, and a concavo-concave untinted plastic lens part having an upper thickened portion due to the double concavity thereof and having the double curvature discontinued along a lower edge through the generally thinner portions due to double curvature, thereby tending to refract light substantially only upwardly, said plastic lens part being detachably carried by the body portion in registry with said aperture to bring into view of the operator the field of vision beyond the said obstructed upper part of the windshield and at the same time to prevent rays of light of undiminished intensity from striking the eye of the operator.

2. For use with an operator-operated automotive vehicle characterized by a windshield having at least an upper part: an exterior light shade adapted to shade the upper part of the windshield and comprising a body part of relatively smooth contour arranged for being normally disposed in inclination to the vertical and being elongated for extending laterally on either side of the transverse central axis thereof, said body part having a portion deformed with respects to said smooth contour to define a plane at an angle thereto more nearly approaching the vertical and being provided with an opening therethrough, and in combination therewith, a retainer detachably secured to the body part adjacent the opening in said deformed portion and being provided with an opening in spaced registry therewith, and a divergent double concave lens adapted for reception in the aperture defined by said openings to bring into view of the operator the field of vision beyond the shaded upper part of the windshield and at the same time to prevent rays of light of undiminished intensity from striking the eye of the operator, said double concave lens having an upper thickened portion due to the double concavity thereof and having the double curvature discontinued along a lower edge through the generally thinner portions due to double curvature, thereby tending to refract the line of vision substantially only upwardly.

3. For use with an operator-operated motor vehicle characterized by a sloping glass windshield having at least an upper part between the upper corners thereof: an exterior light shade adapted to be detachably affixed to the vehicle to pass across the said upper corners of the windshield and including a downwardly curved sloping visor body therebetween arranged to shade the upper part of the vehicle windshield thus interfering with the visibility through the latter, said visor body having a bottom edge and a wall portion spaced therefrom, said wall portion being laterally offset with respect to the central axis of the visor body and deflected in a plane more nearly approaching the vertical than, and angled with respect to, the downwardly curved slope of the visor body, said last-named wall portion being formed with an opening therein in the aforesaid plane, a double-concave divergent viewer optical device, and apertured retainer means for the viewer device detachably secured to the visor body with the aperture coaxial with said opening and cooperating with the visor body to support the viewer device operatively at said opening for bringing into the operator's view upon looking upward the field of vision beyond said shaded upper part of the windshield and at the same time to prevent rays of light of undiminished intensity from striking the eye of the operator.

4. For use with an operator-operated automotive vehicle characterized by a sloping windshield having at least an upper part: an exterior light shade adapted to shade the upper part of the windshield and comprising a body part of relatively smooth contour arranged for being normally disposed in inclination to the vertical and being elongated for extending laterally of either side of the transverse central axis thereof, said body part having a wall portion deformed with respect to said smooth contour of the body part at a position laterally offset with respect to said transverse central axis and defining a plane more nearly approaching the vertical than, and angled with respect to the said smooth contour of the body part, and said wall portion being provided with an opening therethrough, and in combination therewith, a retainer detachably secured to the body part adjacent the opening in said deformed portion and being provided with an opening in spaced registry therewith, and a divergent double-concave untinted lens adapted for reception in the aperture defined by said openings to bring into view of the operator upon looking upward the field of vision beyond the shaded upper part of the windshield and at the same time to prevent rays of light of undiminished intensity from striking the eye of the operator.

5. For use with an operator-operated automotive vehicle characterized by a sloping windshield having at least an upper part: an exterior light shade adapted to shade the upper part of the windshield and comprising a body part of relatively smooth contour arranged for being normally disposed in inclination to the vertical and being elongated for extending laterally on either side of the transverse central axis thereof, said body part having at least one substantially vertical wall portion press-formed in the contour of the body part thus being at an angle thereto and being disposed at a location spaced with respect to said transverse central axis, said press-formed wall portion having an opening therethrough, and in combination therewith, a retainer detachably secured to the body part adjacent the opening in said deformed wall portion and being provided with an opening in spaced registry therewith, and concavo-concave viewer lens means adapted for reception in the aperture defined by said openings to bring into view of the operator upon looking upward the field of vision beyond the shaded upper part of the windshield and at the same time to prevent rays of light of undiminished intensity from striking the eye of the operator.

HENRY H. ZEDER.
JOHN B. DICKSON.
ELMER G. ZEEB.

References Cited in the file of this patent

UNITED STATES PATENTS

| Number | Name | Date |
|---|---|---|
| 1,593,559 | Arnold | July 27, 1926 |
| 1,637,309 | David | July 26, 1927 |
| 1,678,479 | Patten et al. | July 24, 1928 |
| 1,735,177 | Pearce | Nov. 12, 1929 |
| 1,745,197 | Tirpak | Jan. 28, 1930 |
| 1,826,090 | Phelps | Oct. 6, 1931 |
| 1,933,333 | Morgan | Oct. 31, 1933 |
| 2,334,856 | Atkinson | Nov. 23, 1943 |
| 2,566,934 | Dieterich | Sept. 4, 1951 |
| 2,602,367 | Falge et al. | July 8, 1952 |